United States Patent [19]

Ortiz

[11] Patent Number: 5,491,927
[45] Date of Patent: Feb. 20, 1996

[54] FISHING LURE WITH INTERCHANGEABLE SKIRT

[76] Inventor: Philip V. Ortiz, 1228 Linton, LaMarque, Tex. 77568

[21] Appl. No.: 320,059

[22] Filed: Oct. 7, 1994

[51] Int. Cl.⁶ .................................................. A01K 85/00
[52] U.S. Cl. .................... 43/42.28; 43/42.37; 43/42.39
[58] Field of Search ................. 43/42.25, 42.28, 43/42.37, 42.39, 44.01, 42.26

[56] References Cited

U.S. PATENT DOCUMENTS

| | | | |
|---|---|---|---|
| D. 349,746 | 8/1994 | Patrin | D22/122 |
| D. 349,747 | 8/1994 | Brawley | D22/128 |
| 3,017,307 | 1/1962 | Halliburton | 43/42.25 X |
| 3,170,756 | 2/1965 | Butler | 43/43.4 |
| 3,564,754 | 2/1971 | Brawley | 43/42.26 |
| 3,605,317 | 9/1971 | Pobst | 43/42.25 |
| 3,769,738 | 11/1973 | Begley | 43/42.26 |
| 3,996,688 | 12/1976 | Hardwicke, III | 43/42.28 X |
| 4,163,337 | 8/1979 | Kress | 43/42.05 |
| 4,791,749 | 12/1988 | Stazo | 43/42.29 |
| 4,799,329 | 1/1989 | Paulsen | 43/42.28 |
| 5,251,395 | 10/1993 | Wicklund | 43/42.25 |
| 5,261,182 | 11/1993 | Link | 43/42.37 X |

*Primary Examiner*—P. Austin Bradley
*Assistant Examiner*—Jeanne M. Elpel

[57] ABSTRACT

A fishing lure for use in conjunction with disposable lure bodies having skirt forward application. The fishing lure includes a skirt attachment which enables rapid skirt replacement and positions the skirt forward of the mass of the fishing lure. The skirt attachment includes a skirt holder and a nose portion to secure the skirt in place.

7 Claims, 3 Drawing Sheets

FISHING LURE WITH INTERCHANGEABLE SKIRT

SCOPE OF THE INVENTION

The present invention relates to an improved fishing lure. More particularly, the present invention relates to an improved fishing lure having a jighead configured to allow forward positioning of a skirt and easy removal and interchange of fishing skirts.

BACKGROUND OF THE INVENTION

Commercial and sport fishing have become major industries. The goal of the fisherman is to catch the most and biggest fish that he can. In helping the fisherman to accomplish this goal, the design of artificial lures plays an important role. Artificial lures are typically configured to simulate life-like action of fresh and salt water fish and other bait.

For many years fisherman have used fishing skirts attached to jighead fishing lures to simulate live bait. Such skirts come in different colors, sizes and shapes.

It is well known to fisherman that different fish are attracted to different colors and sizes of fishing lures. Fisherman have noticed that certain lakes, bays, and off-shore fishing yield different results with different colors and sizes. This difference depends in part upon a number of factors such as water clarity and temperature. Thus, on a certain day in a certain lake, the same configuration in yellow can yield one result while the same lure and configuration in red might yield an entirely different result. Additionally, the size of the skirt makes the bait appear larger and thus may affect the size of fish caught. Finally, multicolored skirts or skirts having reflective flecks may affect the results.

Thus, it is in the fisherman's best interest to have a wide variety of lures. However, multiple purchases of lures to obtain different colored and sized skirts can be expensive.

In addition, changing lures can be relatively time consuming. If fish are working, the fisherman may need to change lures in a minimal amount of time. Another concern is that skirts may be torn or become worn after working areas of a fishing location, i.e. brush, trees, rocks, etc. The fisherman needs a durable lure body which enables rapid skirt replacement.

While skirts have been used for years on fishing lures and in particular jighead bodies, the prior art does not envision ready removal and interchange of skirts. As seen in FIG. 1 illustrating prior art, the jighead body has an eye to attach the fishing line, a fishing hook on the opposite end and a body with a taper. The skirt slides up the taper of the jighead and remains fixed until it is cut off. The typical taper has barbs. Thus, manufacturers configure the skirt to slide on with difficulty and remain fixed.

As will be discussed in more detail, FIG. 2 shows another prior art example. The jighead does not include a skirt. A flexible, resilient lure body is threaded around the hook and pushed up on the jighead. The flexible lure body provides some movement and is attractive to fish. However, a skirt cannot be attached to this type of lure.

More sophisticated uses of skirts can occur with the placement of the skirt. For instance, if the skirt is located ahead of the attaching point of the fishing line, it appears to have different movements than if it were attached behind the point the fishing line is attached. This difference is even more noticeable with the use of soft flexible lure bodies such as minnows, worms, crayfish, and touts.

More specifically, the skirt's placement with respect to an axis of decent of the fishing lure is important to certain movements. As used herein, the axis of decent is a line through which the lure body falls in a free state in water at an acute angle having a base leg in line with gravity. The angle varies depending on weight of the lure, drag of the lure body, and other such factors. In the free state when the fishing lure falls in water, it will fall along an axis pointing to the bottom along some angle between zero degrees pointing toward the bottom and ninety degrees pointing horizontally. By placing the skirt in front of the jighead body along the axis in a direction of the angle of decent, the skirt has greater range of motion. As the fisherman "works the bait" up and down in the water, the skirt moves. As the skirt descends toward the bottom, the strands of the skirt vibrate one direction. As it is pulled up, the strands vibrate in another direction. This change adds life-like movements to the bait. The movement of such a lure can simulate movement such as squid along the ocean floor.

In attempting to combine the use of the skirt with the lure body using the prior art, different combinations were unsuccessful. At first, a skirt was placed on the shank and then the lure body pushed onto the remaining length of the shank. However, this combination proved unsuccessful. The remaining length was insufficient to properly secure the lure body. When retrieving the lure, the lure body would come off and slide down the hook. To compensate for this problem, the shank was lengthened. However, this led to other difficulties. To properly use the lure having a jighead, the lure is allowed to drop to the bottom, momentarily rest, then by a small jerk of the line the lure is lifted off the bottom only to settle on its own weight to the bottom again. This movement is reminiscent of a weak or injured bait which is attractive to fish. For the lure to properly descend, sufficient weight in the jighead is necessary so that the jighead remains in front of the lure body. It was discovered that when the shank was extended, balance of the lure was affected and the lure did not properly descend. To reestablish the balance, consideration was given to shortening the tail of the lure body. However, this option was not viable. A shortened tail yields less flexibility and therefore less attractive movement.

In the prior art reviewed herein, the issue of interchangeability of skirts appears to have been overlooked. Also, a skirt positioned forward of the mass of the lure body along the axis of decent has been overlooked.

Halliburton in U.S. Pat. No. 3,017,307 discloses a process for fixedly attaching a skirt to a jighead.

Butler in U.S. Pat. No. 3,170,756 discloses a snag-proof hook protector.

Brawley in U.S. Pat. Des. No. 220,099 and U.S. Pat. No. 3,564,754 discloses a skirt in part facing toward the head of the lure but tied behind the head and eye in a fixed arrangement.

Pobst in U.S. Pat. No. 3,605,317 discloses a weedless, weightless fishing fly using the hook orientation as a keel.

Begley in U.S. Pat. No. 3,769,738 discloses a lure whose skirt is wrapped and tied by a tie wire behind the eye and head of the lure.

Kress in U.S. Pat. No. 4,163,337 discloses a hollow plug body that allows the housing to move away from the hook after being struck by a fish.

Paulsen in U.S. Pat. No. 4,799,329 discloses a head having a groove that forces the skirt strands outwardly at right angles to project a substantial distance from the lure body when at rest or when moving through the water. These skirt strands are tied in place by a leader.

Wicklund in U.S. Pat. No. 5,251,395 discloses a printed elastomer fishing lure dressing on the surfaces or strands of the skirt. The skirt shown is positioned in the typical placement as seen in FIG. 1.

Patrin in U.S. Pat. Des. No. 349, 747 discloses a head with a skirt fixed behind the main portion of the jighead.

Thus, there exists an unfulfilled need for readily removable and interchangeable skirts on fishing lures, in particular jighead lures. A need exists for such interchangeability eliminating the need to cut and retie a fishing line. The present invention enables such rapid replacement. The present invention attaches the skirt in front of the mass of the lure along an axis in the angle of decent. This position allows for easy interchange. The skirt positioning of the present invention also allows for a change in lure motion. Further, the skirt placement of the present invention "breathes" better than prior art. The skirt moves more vibrantly and is more attractive to fish.

Additionally, because the skirt is in front of the principal parts of the jighead, painting of the jighead is unnecessary. Typically, when the skirt is behind the jighead, the manufacturer must paint the surfaces of the jighead to simulate live bait. When the paint becomes damaged, fisherman must retouch the paint to maintain this simulation. Without the need of painting, the manufacturer saves production costs without detracting from the lure's appeal.

The present invention offers several advantages. A fisherman with a few jighead lures can have a much more effective collection with the addition of less expensive skirts. Additionally, rapid skirt change allows the fisherman to keep his lure in the water a higher percentage of the time. Fish are more attracted to a breathing skirt. Bigger fish are attracted, because the lure appears bigger when led by a skirt. These features provide commercial attractiveness to the sale of the lures of the present invention.

SUMMARY OF THE INVENTION

The present invention provides an improved fishing lure. It provides ready removal and interchange of fishing skirts on lures, in particular, jighead lures. The skirt's position on the jighead lure allows for this easy interchange. The lure of the present invention also provides skirt application forward of the mass of the lure. The position also enables life-like movement of the skirt in the water.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The above drawings illustrate different preferred embodiments, wherein like members bear like referenced numerals in the several figures.

DETAILED DESCRIPTION

The present invention relates to the placement of a skirt in line so that the skirt falls in front of the remainder of the lure long an axis of decent in water. Whether the skirt is positioned toward the eye or behind the eye, in decent through water the skirt leads the lure along its axis of decent.

Figure 1:
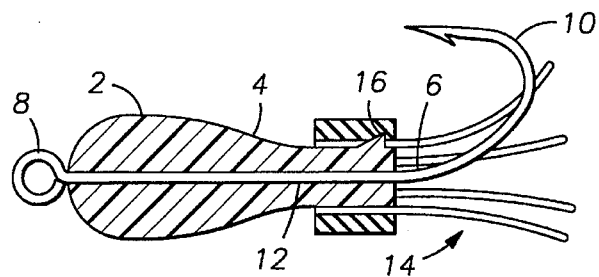
FIG. 1 is a typical embodiment of the prior art showing a tapered lead body wherein the skirt semi-permanently attaches to the lead body by friction.

FIG. 1 is a typical example of the prior art. Leadhead 2 generally is made of lead and has a leadhead taper 4 formed about a continuous wire 6. The wire 6 has an eye 8 on one end and a hook 10 on the other end. A skirt tube 12 of a skirt 14 is threaded onto the hook 10 and engages the leadhead taper 4. The skirt tube 12 is forcibly pushed onto the leadhead taper 4 forming a friction fit. Additionally, leadhead taper barb 16 secures the skirt 14. It is difficult to interchange skirt 14 in this arrangement. The practice is to purchase multiple lures at extra expense in varying color combinations and sizes. Generally, new skirts are not placed on the leadhead 2 when the old skirt 14 is damaged or lost.

Figure 2:
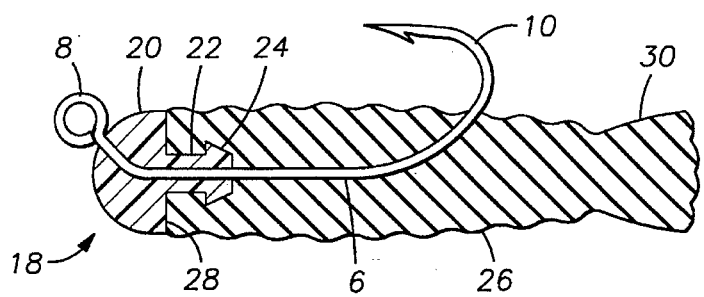
FIG. 2 is another example of prior art showing a jighead.

FIG. 2 is another example of prior art. Leadhead 18 is also generally made of lead. Leadhead 18 has a mast head 20 connected to a shank 22 and ending with a keeper 24. A soft, flexible, and moderately resilient lure body 26 is typically used with this type of leadhead 18. These types of lure bodies are widely used by fisherman and are generally formed from materials such as polyvinyl chloride and blends of various polymers, plasticizers, coloring agents for lifelike shapes, consistencies, and movements of the lure body.

The lure body 26 is pushed over the hook 10 and continuous wire 6 and onto the shank 22 and keeper 24 until the lure body touches the rear 28 of the mast 20.

Figure 3:
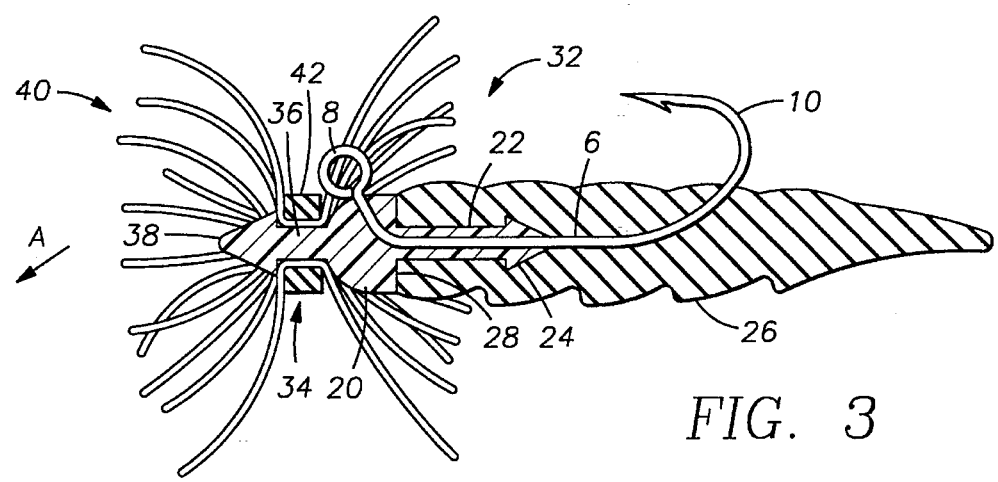
FIG. 3 is an assembled fishing lure showing an interchangeable skirt, an improved fishing lure jighead, and a flexible lure body.

FIG. 3 shows a typical embodiment of the present invention in the form of an assembled lure 32. More specifically, a jighead 34 is generally circular and extends down a portion of the continuous wire 6. An eye 8 protrudes from the jighead 34. The jighead 34 has a skirt holder 36 protruding from a mast head 20. A skirt holder 36 has a smaller circumference than the mast head 20. Forward of the skirt holder 36 is a nose 38. The nose 38 has a larger circumference compared to the skirt holder 36. A skirt 40 is pushed over the nose 38 to fit on the circumference of skirt holder 36. The skirt is in a frontal position from the main portion of the jighead along the axis of decent A. A shank 22 is attached behind mast head 20. Behind the shank 22 is a keeper 24. A lure body 26 is forced over the hook 10 and pushed past the circumference of the keeper 24 until it touches a rear 28 of the mast head 20. The keeper 24 has a larger circumference than the shank 22 so that lure body 26 will stay in proximity to the rear 28.

This embodiment of the present invention places the skirt 40 ahead of the mast head 20 and eye 8. The skirt 40 can be pulled off and interchanged with an assortment of different colored and sized skirts, making this lure a more universal lure.

Figure 4:
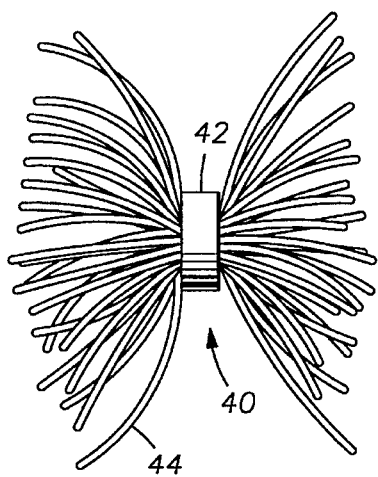
FIG. 4 shows a typical interchangeable skirt.

FIG. 4 shows an interchangeable skirt 40. A skirt collar 42 forms the portion that fits over the skirt holder 36 (shown in FIG. 3). It is composed of rubber or various polymers, so that it is flexible and resilient. Protruding from the skirt collar 42 are skirt strands 44. The skirt strands can be made of materials such as fur, feathers, rubber or other polymers. FIG. 34 shows skirt strands 44 protruding from both sides of the skirt collar 42 around the circumference. However, the skirt strands 44 can be formed on one side of the skirt collar 42 and can be formed in asymmetrical fashion around the circumference of the skirt collar 42.

Figure 5:
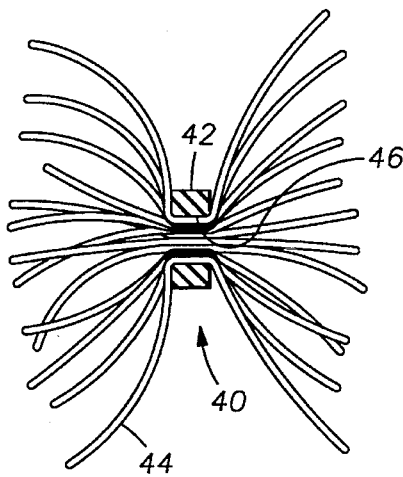
FIG. 5 shows a cross section of the skirt.

FIG. 5 shows a cross section of a skirt 40. The skirt collar 42 has an inside collar diameter 46. The inside collar diameter 46 is dimensioned to be pushed over the nose 38 by hand and fit around the skirt holder 36, as shown in FIG. 3. However, the inside collar diameter 46 must not be so large that the skirt collar 42 can slip over the nose 38 in the normal use of the lure 32, as shown in FIG. 3.

Figure 6:
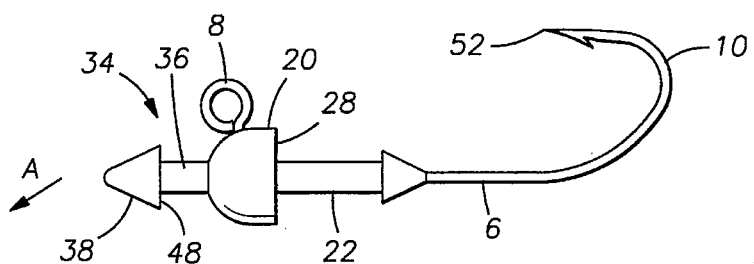
FIG. 6 shows a configuration of a jighead with a hook and an eye, where the skirt is in front of the eye along an axis in the angle of decent.

To better view the structure, the skirt 40 (shown in FIG. 3) is not shown in FIG. 6 and the remaining embodiments. However, the structure of the various jigheads in the embodiments allow the skirt to fit as described.

FIG. 6 shows a jighead 34, where the skirt placement is in front of an eye 8 to allow ready removal and interchange of a skirt 40 (shown in FIG. 3). Extending outward from a mast head is an eye 8 which is connected to a wire 6 which has a hook 10 terminating in a hook barb 52. A skirt holder 36 is in front of a mast head 20. A nose 38 is attached in front of the skirt holder 36. The nose 38 can be conical as shown in FIG. 6, but other shapes are equally suitable. The key is that nose 38 must be sufficiently coordinated in size to the inside collar diameter 46 of FIG. 5, so that the skirt 40 does not detach from the jighead 34 under normal use. Yet, the nose 38 must not be too large so that the skirt 40 cannot be easily removed by hand pressure and interchanged with other skirts. An advantage of the embodiment in FIG. 6 and other embodiments that will be shown is that a fisherman does not need to cut a fishing line or even detach a lure to interchange various skirts. The skirt is in front of the remainder of the jighead and in front of the eye along the axis of decent A. A fishing line is tied to the eye 8, thus leaving free access to the skirt holder 36 to interchange the skirt 40 of FIG. 3.

Figure 7:
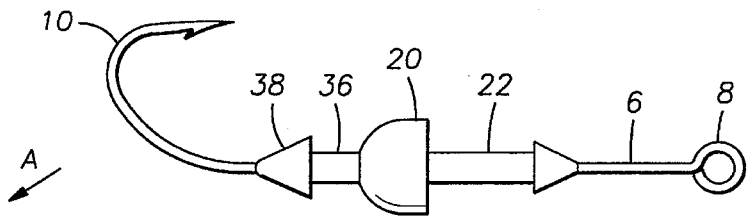
FIG. 7 shows the skirt in a reverse configuration of FIG. 6, but where the skirt placement is forward along an axis in the angle of decent.

FIG. 7 shows a reverse embodiment of FIG. 6, but where the skirt 40 is still able to be readily interchanged. The skirt's placement is still in front of the axis of decent A compared to a lure body 26 (shown in FIG. 3) attached to a shank 22. An eye 8 is more central to a wire 6 on one end. A hook 20 extends to the other end of the wire 6. A nose 38 points towards the hook 10. The lure body 26 (shown in FIG. 3) is pushed onto the shank 22 of FIG. 7. The skirt 40 (shown in FIG. 3) is threaded over the hook 10 of FIG. 7, over the nose 38, and circles a skirt holder 36.

Even more noticeable in this embodiment is the breathing aspect of the skirt 40. As the fisherman pulls on the lure at the eye 8, the skirt 40 attached to the skirt holder 36 folds away from the mast head 20. However, when the lure is released and allowed to drop to the bottom in working the jig, the lure descends in the direction of the hook 10. Thus, the skirt folds the other direction, towards the mast head 20. This action simulates the life-like action and appearance of a bait. Prior art lures, where the skirt 40 is attached behind the mast head 20 with respect to the axis of decent A, do not accomplish this feature. Additionally, by placement of the eye 8 in FIG. 7 along the central axis of the wire 6, a different motion of the lure in the water is accomplished compared to the placement of the eye 8 in FIG. 6.

Figure 8:
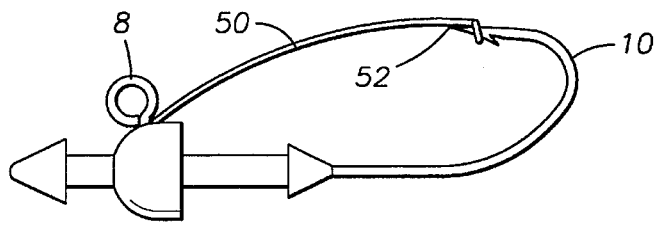
FIG. 8 shows a weedless configuration for the embodiment of FIG. 3.

FIG. 8 shows a variation of FIG. 6. Upon occasion, fishermen use lures in areas with different obstructions or debris. It is advantageous to have a mechanism which keeps the lure from being entangled in the debris. Attached to the eye 8 of the lure shown in FIG. 8 is a weed guard 50. The weed guard 50 is typically made of a resilient material which points towards and sometimes touches a hook barb 52 at the tip of a hook 10.

Figure 9:
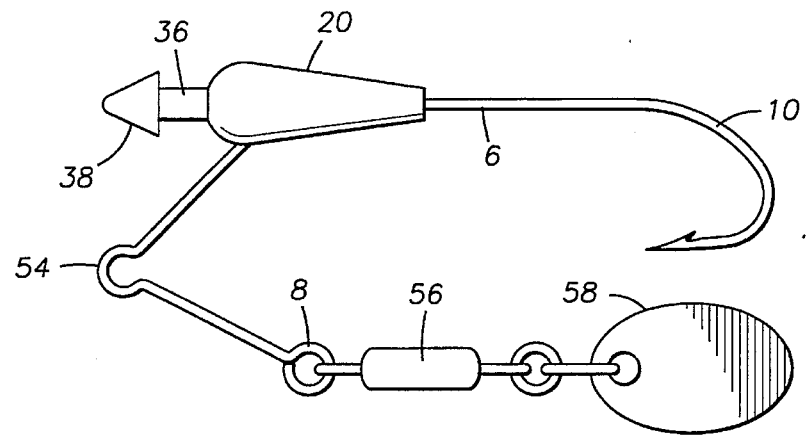
FIG. 9 shows an alternate form of FIG. 3 with a spinner blade attached to the eye.

FIG. 9 discloses a variation of the wire 6 of FIG. 6. Instead of an eye 8 protruding immediately from a mast head 20, the wire 6 is extended through the mast head 20. The wire 6 then forms a wire arm 54 which terminates in the eye 8. Attached to the eye 8 is a barrel swivel 56 which allows a spinner blade 58 to rotate as the lure is pulled through the water. Typically, the spinner blade 58 can be shiny or painted and can be metallic or plastic.

Figure 10:
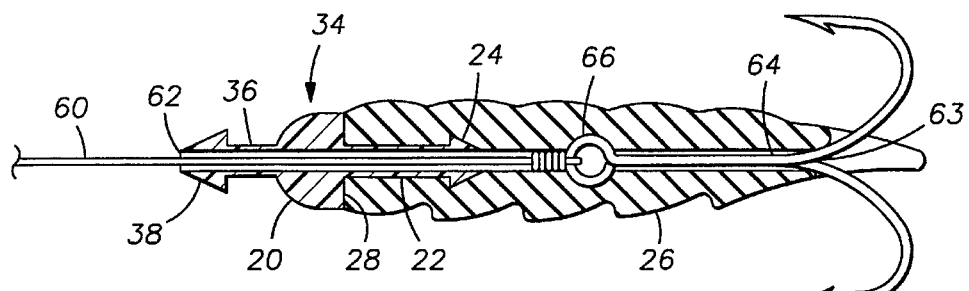
FIG. 10 shows another embodiment without the skirt, where the jighead is bored, allowing the fishing line to be tied directly to a hook.

FIG. 10 shows a variation of the jighead 34 shown in FIG. 3. This embodiment of the jighead 34 does not have a wire 6 as shown in the prior embodiments. The skirt 40 is placed on a skirt holder 36. Then, a fishing line 60 is threaded through a jighead bore 62 in the jighead 34 and through the other side. A lure body 26 has a lure body bore 63 through which the fishing line 60 is also pushed. The fishing line 60 is then tied to a hook eye 66 of a hook 64. This embodiment has the advantage that the hook 64 can be multiple barbed and still use a skirt ahead of the mast head 20 with a lure body 26 in the angle of decent. This feature is in contrast to the embodiment of FIG. 6, wherein a single point hook is necessary to thread the lure body down the hook 10 and onto the shank 22.

Figure 11:
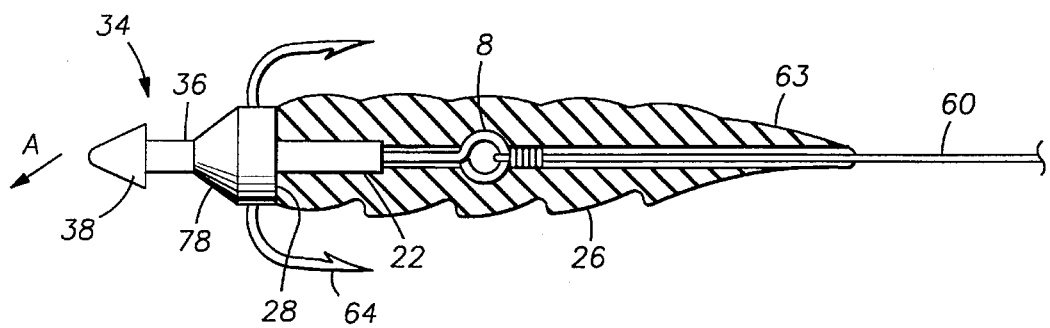
FIG. 11 shows another embodiment without the skirt in a reverse configuration from FIG. 3, where the placement of the skirt is forward along an axis the angle of decent.

FIG. 11 is another embodiment drawing from the principals of the prior embodiments. A fishing line 60 is threaded through a lure body bore 63 of the lure body 26 and tied to an eye 8. The lure body 26 then is pushed over a shank 22. Until it touches the rear 28 of a conical mast head 78. A conical mast head 78 is shown in this embodiment, but other shapes such as the hemispherical mast head 20 are also applicable. The shank 22 does not have a keeper 24 as shown in the prior embodiments. However, one may be used. The skirt holder 36 attached to the nose 38, as has been described in the previous embodiments, is in front of the conical mast head 78 in the axis of decent A. Attached to the jighead 34 is a multiple barb hook 64. However, a single barb hook 10 (shown in FIG. 6) could be used. In many cases, a fisherman prefers to use the multiple barbed hook 64.

This embodiment again shows an advantage of the present invention. Upon pulling on a fishing line 60, a skirt 40 folds away from the conical mast head 78. Upon "working the jig" by letting the assembled lure fall to the bottom along the axis of decent A, the skirt 40 folds in the opposite direction and toward the conical mast head 78. This life-like movement attracts the fish.

Figure 12:
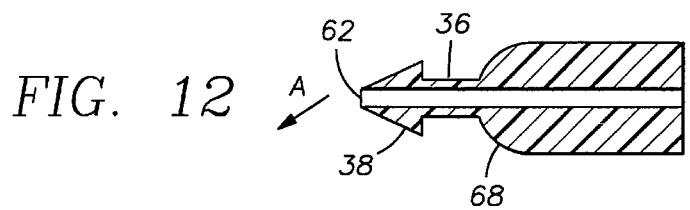
FIG. 12 shows a slip jighead without a hook.

FIG. 12 shows a slip jighead 68 with an accompanying skirt holder 36, a nose 38, and a jighead bore 62. This embodiment is similar to slip weights known to the industry and used with artificial lures such as plastic worms. However, this embodiment includes the concept of a interchangeable skirt 40 (shown in FIG. 5) incorporated into the slip weight. The combination of the skirt 40 secured to the slip jighead adds a variety of new and distinct options to the standard worm rig known to those in the art and to the typical use of slip weights. The slip jighead is tied in front of a worm rig and the skirt is in front of the main lure body along the axis of decent A.

Figure 13:
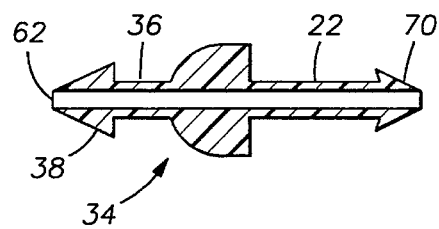
FIG. 13 shows a slip jighead with a barb to secure a soft lure body.

FIG. 13 is similar to the embodiment of the jighead 34 in FIG. 10. It has a jighead barb 70 to further secure the lure body 26 (shown in FIG. 10).

Figure 14:
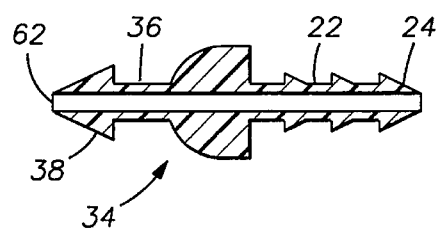
FIG. 14 shows a variation of FIG. 13 with multiple barbs for the lure body.

FIG. 14 is another variation of the jighead 34 shown in FIG. 10. a shank 22 has multiple keepers 24 to further assist in securing the lure body 26 to the jighead 34. The advantage of the multiple keepers 24 over larger jighead barbs is that less tearing is done to a plastic lure body 26.

Figure 15:
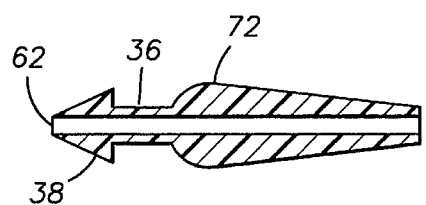
FIG. 15 shows a smaller diameter tube slip jighead, designed for hollow soft lure bodies, known as tube lures.

FIG. 15 shows a modified jighead. This jighead is a tube slip jighead 72. It is designed for a particular type of lure body which has a large bore and a thin wall resembling a tube. The tube slip jighead 72 has jighead bore 62 to allow the fishing line to slip through the jighead 72 in the fashion of FIG. 10. The narrow shape of this jighead 72 allows more of the jighead to be inserted into the lure body to hide it from the fish. In some instances, this results in greater attractiveness of the lure. Attached ahead of the tube slipped jighead 72 is the skirt holder 36 and nose 38, as has been previously described.

Figure 16:
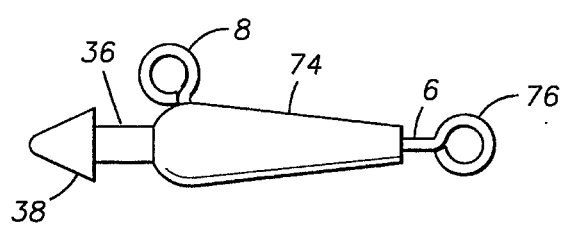
FIG. 16 shows a variation of FIG. 15 with an eye on one end next to the portion designed for the removable skirt and a second eye on the distal end.

FIG. 16 shows a variation of the jighead of FIG. 15. A tube teardrop jighead 74 surrounds a wire 6. The wire 6 has an eye 8 on the forward end and a rear eye 76 on the aft end. Attached ahead of the two teardrop jigheads is a skirt holder 36 and nose 38. The rear eye 76 allows for the attachment for various devices, such as hooks, weights, and other lures.

It will be understood that certain combinations and subcombinations of the invention are of utility and may be employed without reference to other features in subcombination(s). This is contemplated by and is within the scope of the present invention. As many possible embodiments may be made of this invention without departing from the spirit and scope thereof, it is to be understood that all matters hereinabove set forth and shown in the accompanying drawing are to be interpreted as illustrative and not as limitations.

While the foregoing is directed to the preferred embodiments, the scope thereof is determined by the claims which follow:

I claim:

1. A jighead comprising:
   a. a substantially convex main body member having a domed portion and a base portion;
   b. a skirt attachment portion extending from the domed portion of the main body member;
   c. a jighead shank extending from the base portion; and
   d. a wire member is disposed within the body member and the shank.

2. The jighead of claim 1 wherein the wire member extends along a central axis of the body member and the jighead shank, the wire member having an eye at a first end exiting the body member at an angle through the domed portion and a hook member at a second end extending from the shank.

3. The jighead of claim 2 further comprising a resilient flexible member extending from the body member pointing toward the tip of the hook member for deflecting debris from the tip of the hook member.

4. The jighead of claim 2 wherein the eye supports a spinner blade.

5. The jighead of claim 1 wherein the wire member extends along a central axis of the body member and the jighead shank, the wire member having an eye at a first end exiting the body member at an angle through the domed portion and a second eye member exiting through the shank.

6. The jighead of claim 1 wherein the wire member further comprises an eye member extending from the jighead shank and a hook portion extending from the skirt attachment portion.

7. A fishing lure comprising:
   a generally cylindrical body portion;
   b. a skirt attachment portion connected to and extending forward of the mass of the body portion wherein said skirt attachment portion comprises a generally cylindrical skirt holder connected to and extending from the body portion and terminating in a generally conical nose portion;
   c. wherein the body portion and the skirt attachment portion define a central bore;
   d. a continuous wire member disposed within the body member, the wire member having a first eye portion extending from a first end of the body member and a second eye portion extending from a second end of the body member; and
   e. wherein the first eye portion supports a spinner blade.

\* \* \* \* \*